United States Patent Office
2,748,876
Patented June 5, 1956

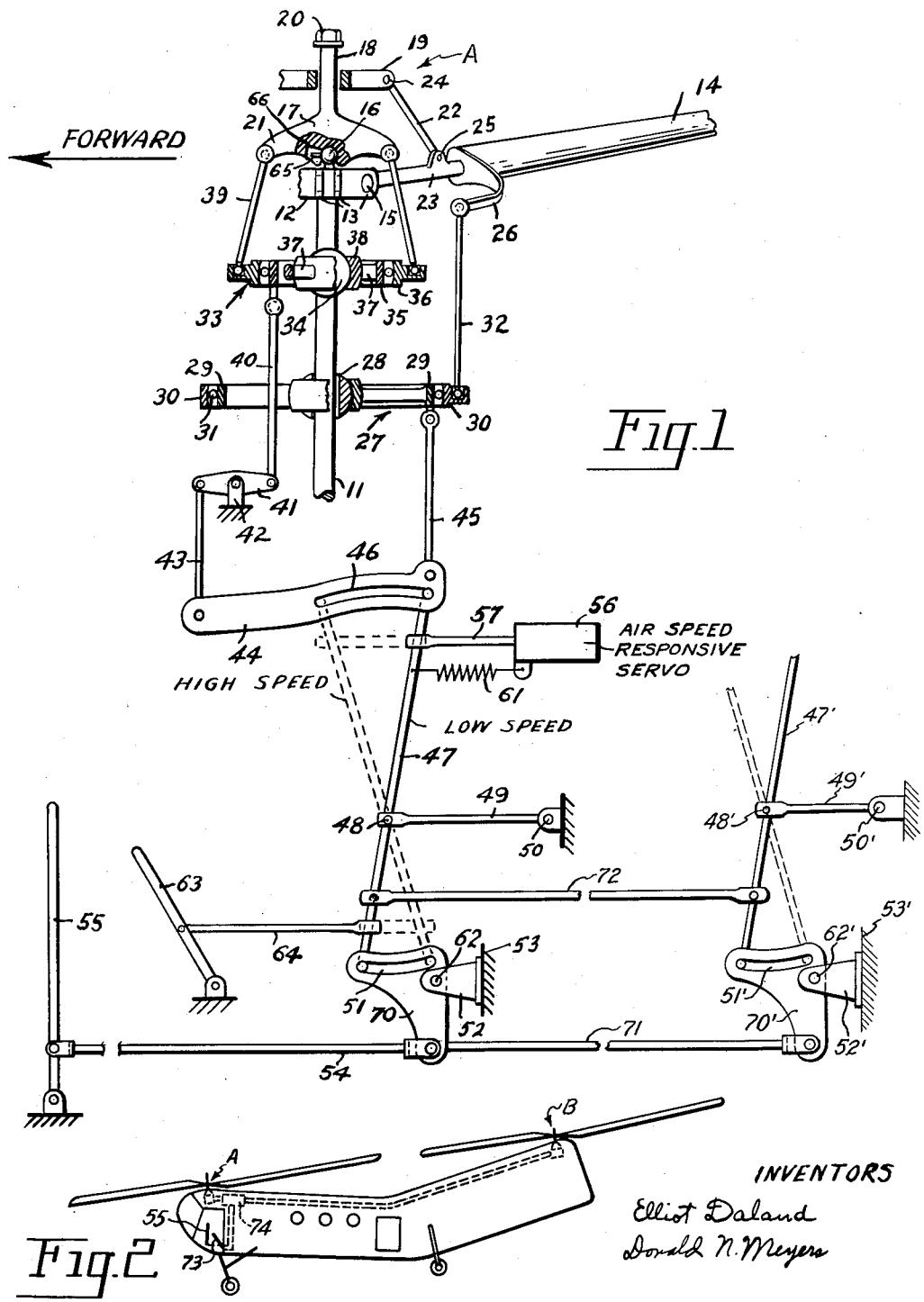

2,748,876

MEANS FOR CONTROLLING TIP-PATH OF ROTORS

Elliot Daland, Wallingford, and Donald N. Meyers, Philadelphia, Pa., assignors to Vertol Aircraft Corporation, a corporation of Pennsylvania Application January 12, 1951, Serial No. 205,779

6 Claims. (Cl. 170—135.24)

This invention relates in general to helicopters having hinged rotors arranged in tandem and provided with controls similar to those described and claimed in the co-pending application of Elliot Daland, Ser. No. 729,565, filed February 19, 1947, now Patent No. 2,555,577. These helicopters are controlled in speed and direction by changing the angle of attack of the blades of the rotors either simultaneously or cyclically throughout all or part of the circular path described by the blades. The blades ordinarily describe a conical path when rotated under flight conditions about the rotor axis. When the axis of the cone is tilted in any direction there results a horizontal component of thrust in the direction of tilt.

In tandem rotored helicopters, control about the pitch axis of the aircraft is primarily provided by the differential collective pitch setting of the rotors. As used herein "differential collective pitch" denotes the difference in collective pitch between the two rotors giving one rotor a greater lifting vector than the other. As the craft moves forwardly through the air the blades on one side of the rotor will be advancing into moving air whereas the blades on the opposite side will be retreating with the moving air. Since the lift of a blade is a function of the square of the speed with respect to the air, the lift of the blade advancing into the moving air will be greater than that of a retreating blade. At high speeds due to the increase in velocity of an advancing blade and hence lift, the blade will flap up in front thereby causing a backward tilt of the lift vector of the rotor which in turn limits the top speed of this type of aircraft.

Accordingly, it is the principal object of this invention to provide automatic cyclic control to the rotor to prevent the blades from flapping up in front during high speeds of the aircraft.

Another object of this invention is to provide means for varying the cyclic control of the rotor in direct proportion to the forward speed of the aircraft.

Another object of this invention is to provide means for automatically applying this control in direct proportion to the flapping forces produced by forward translation of the aircraft at high speeds, or flapping forces produced by gusts.

It has also been found desirable at low speeds to increase the degree of cyclic control applied by the manually operated control means to cause forward or rearward translation of the aircraft without tilting the attitude of the aircraft. This is particularly important if the craft is flying close to the ground. Under these conditions the automatic control of the cyclic pitch control means produced by flapping forces is usually undesirable. Therefore, another object of this invention is to provide means to vary the degree of manually applied fore and aft cyclic control at low speeds and to further provide means to vary the degree of automatic fore and aft cyclic control applied in response to flapping forces.

These and other objects will become apparent when considered with the following specification and claims taken in view of the accompanying drawing in which:

Figure 1 is an elevational view of the rotor head with parts broken away and parts sectioned to show the construction of the control means. To simplfy the drawing the collective pitch control mechanism has been omitted.

Fig. 2 is a schematic view of a tandem helicopter provided with controls to differentially change the collective pitch of the rotors for control about the pitch axis and to cyclically change the pitch of the rotor blades. Details of the control system are not shown as they are fully shown in copending application of Elliot Daland, Serial No. 729,565, filed February 19, 1947, now Patent No. 2,555,577.

Rotor hub 12 of the front rotor A is rigidly fixed to shaft 11 and is provided with ears 13 for mounting the rotor blades 14 to permit flapping in a vertical plane. Although vertical pins are usually used they have been omitted for sake of clarity. Hinged to ears 13 by pins 15 are the blades 14. Blades 14 are in addition capable of rotation about the longitudinal axis of shaft or spar 23 by means of a ball bearing connection not shown. Although only one blade is actually shown this invention can be applied to, two, three, or multibladed rotors. The system shown in the drawing contemplates three blades spaced radially apart 120°. On the vertical axis of the hub 12 is a machined spherical ball 16 which is an integral part of said hub member. A cap member 17 having a complemental socket for ball 16 is mounted for tilting movement thereon. A pin 65 extending from spherical ball 16 extends within slot 66 of cap 17 and rotates said cap member with the hub 12. Extending upwardly from cap member 17 is a shaft 18 upon which slides a bearing member 19. The top of the shaft 18 is threaded to receive a washer and nut 20 which act to limit the upward travel of bearing member 19. Downward motion of member 19 is limited by enlarged arm portions 21 of cap member 17. Links 22 connect shaft 23 of blade 14 and bearing member 19 by means of pin connections 24 and 25. These elements constitute means for sensing the tip-path of the rotor as will be described below. A swash plate 27 which constitutes the control means for the rotor is mounted by a spherical bearing 28 for vertical and tilting movement upon rotor drive shaft 11. Swash plate 27 comprises in addition an inner ball bearing race 29 and an outer ball bearing race 30. The outer race 30 by means of ball bearings 31 is adapted to rotate with blades 14 about the axis of shaft 11. Swash plate 27 by virtue of spherical bearing 28 is capable of universal tilting action and up and down motion on shaft 11. Link 32 is connected by suitable ball and socket connections to outer race 30 and pitch arm 26. Any inclinations induced in swash plate 27 are conveyed to pitch arm 26 and act to rotate blade 14 about its longitudinal axis.

A tip-path swash plate 33 which is responsive to changes in the tip-path of the rotor is fixed to shaft 11 by means of spherical bearing 34. Swash plate 33 comprises an inner ball bearing race 35 and an outer ball bearing race 36. Spokes 37 connect the inner race 35 to complemental spherical bearing surface 38. Links 39 are connected by ball and socket connections to outer race 36 and arms 21 of the aforementioned cap member 17. Inner race 35 has suspended therefrom by a ball joint connection, a link 40 which is pin connected to a level 41. Link 40 is located at the front position of swash plate 33 so as to transmit tilting of said swash plate about an axis parallel to the pitching axis of the aircraft. Lever 41 is pivotally mounted by bearing 42 to a suitable bracket upon the craft. One end of link 43 is likewise pin connected to lever 41 opposite to the connection of link 40 and its other end is pin connected to one end of a Stevens link 44. A link 45 connects the other end of link 44 to the inner race 29 of swash plate 27. Mounted for pivotal sliding movement in slot 46 of link 44 is rod 47 which is pivotally supported by a pin connection 48 to arm 49. The opposite end of arm 49 is pin supported at 50 to a suitable fixed support. The lower end of rod 47 likewise is mounted for pivotal sliding movement in a bell crank slotted as at 51. The inclusion of slots 46 and 51 in members 44 and 70 respectively and the pivoting of the member 47 at 48 provide means to permit adjustable proportioning of control applied by the automatic and manual pitch control described herein. Said adjustment being made by either the servo 56 or lever 63. Adjacent one end of said slot but provided with sufficient clearance is a bracket 52 which pivotally supports bell crank 70, said bracket 52 being rigidly affixed at 53. Link 54 connects control column 55 to bell crank 70. Any fore and aft motion of the control column will actuate the control system in a manner to be hereinafter described.

A servo 56 responsive to changes of airspeed of the craft, acuates fork ended arm 57 which pushes rod 47 in one direction only, that is toward the high speed position end of slot 46. No details of this servo are shown as it can be of any well known construction such as shown in Patents Nos. 1,818,104 or 2,205,610. Tension spring 61 connected to rod 47 and servo 56 normally operates to keep rod 47 in abutment with the forked end of rod 57. At the lower end of rod 47 a manual control column 63 actuates a fork-ended rod 64 which likewise is capable of inducing motion in rod 47 in one direction only.

Rod 71 is connected at one end to bell crank 70 and is linked to the differential collective control system not shown but of the type referred to above. At its other end, rod 71 is connected to a bell crank 70' pivotally mounted at 62' to a bracket 52' which in turn is mounted upon fixed structure 53'. Rod 72 is connected at one end to the rod 47 and at its other end connects to rod 47', which rod is pivotally supported by a pin connection 48' to arm 49'. The opposite end of arm 49' is pin supported at 50' to a suitable fixed support. The lower end of rod 47' is mounted for pivotal sliding movement in the bell crank 70' slotted as at 51' while the other end of rod 47' connects to the cyclic pitch change mechanism of the rear rotor in a manner similar to that shown with respect to the front rotor and rod 47.

Referring now to Figure 2, there is shown a tandem rotor helicopter having a front rotor A and a rear rotor B. In this figure, the cycle control column 55, and the collective pitch control lever 73 are shown, as are the control linkages extending therefrom to the cyclic and collective pitch mechanisms of the front and rear rotors. These linkages pass through means 74 by which movement of the cyclic control column 55 is integrated with the collective pitch control linkage to provide a differential collective pitch by movement of the control column 55.

*Operation*

When the helicopter moves through the air at high speeds, the advancing blade due to its increase in velocity will flap up as it reaches its most forward position. This flapping induces an upward motion in link 22, and would act to move bearing member 19 upwardly except that the retreating blade on the opposite side of said upwardly flapping blade will pull downwardly on corresponding link 22. These forces acting in opposite directions on bearing member 19 prevent said member from sliding upon shaft 18 and resolve into a couple which acts to tilt cap member 17. By means of links 39 any inclination sensed by cap member 17 will be reflected in the tip-path swash plate 33. As the tip-path swash plate 33 is tilted rearwardly, moving rod 40, lever 41 is tilted which actuates rod 43 to rock link 44. If rod 47 is in the high speed position shown in dotted lines, due to the action of the servo 56 which is responsive to changes in speed of the aircraft, a downward force applied through rod 43 will pivot link 44 about the top end of rod 47. This will tilt the swash plate 27 forwardly which in turn will move rod 32 and horn 26 upwardly to decrease the pitch setting of the next advancing blade. Thus it is seen that at high speeds of the aircraft by virtue of the servo actuator and the above described linkages, that automatic cyclic control is provided which acts to prevent the blades from flapping up in the front. When the rod 47 is in the high speed position, any movement of the control column 55 will not move the above mentioned cyclic control linkages because of the relative position between the end of rod 47 and pivot 62.

If the several blades are suddenly loaded as by a gust or by collective increase of pitch, the resulting upward force applied through links 22 will be substantially equal and the bearing member 19 will move upwardly on shaft 18 to permit proper coning of the rotor and will not affect the tip-path control mechanism.

Assuming a low speed or hovering condition of flight the rod 47 is in the full lined position as shown. The servo 56 under this condition withdraws pusher rod 57 to its extreme aft position. The pilot under these circumstances has full cyclic control due to the relationship of the end of rod 47 to the pivot point 62. Any action fore or aft of the control column 55 will, through rod 54, and bell crank 70 induce a vertical motion in rod 47 to tilt the swash plate 27 and hence the pitch setting of the blandes cyclically. Thus, any fore or aft movement of said control column will provide translational movement of the craft without the use of a high degree of differential pitch control previously required.

Under certain conditions such as making a precision landing on the deck of an airplane carrier in gusty weather it might be desirable to have automatic tip-path rotor control. Under such conditions the previously described manual adjustment lever 63 would be moved to the right to push rod 47 against the opposition of spring 61 attached at its opposite end to override the setting dictated by the airspeed responsive element 56. This action pivotally slides the top end of rod 47 to a new position in the slot 46. In the newly selected position any fore and aft movement of the primary control column 55 would result in the desired proportional amount of cyclic control applied automatically and manually depending upon the selected setting of rod 47 in the slots of link 44 and bell crank 70 as dictated by existing flight conditions.

While the preferred embodiment of the invention has been described in detail, it is understood that various changes may be made without departing from the scope of the invention as defined in the appended claims.

We claim:

1. In combination, a helicopter rotor including cyclic pitch control means, a first control means, said first control means comprising mechanism responsive to changes of the tip path of said rotor, a second control means, said second control means comprising a pilot operating member for control of said rotor, control proportioning means, said first and second control means being operatively connected to said proportioning means, said proportioning means being operatively connected to said cyclic pitch control means, and manual adjusting means operatively connected to said proportioning means to vary the degree of control applied by said first and second control means.

2. In combination, a helicopter rotor including cyclic pitch control means, a first control means, said first control means comprising mechanism responsive to changes of the tip path of said rotor, a second control means, said second control means comprising a pilot operating member for control of said rotor, control proportioning means, said first and second control means being operatively connected to said proportioning means, said proportioning means being operatively connected to said cyclic pitch control means, and airspeed responsive means operatively connected to said proportioning means to vary the degree of control applied by said first and second control means.

3. In combination, a helicopter rotor including cyclic pitch control means, a first control means, said first control means comprising mechanism responsive to changes of the tip path of said rotor, a second control means, said second control means comprising a pilot operating member for control of said rotor, control proportioning means, said first and second control means being operatively connected to said proportioning means, said proportioning means being operatively connected to said cyclic pitch control means, manual adjusting means operatively connected to said proportioning means to vary the degree of control applied by said first and second control means, and airspeed responsive means operatively connected to said proportioning means to vary the degree of control applied by said first and second control means.

4. A control apparatus in combination with blade pitch changing mechanism of a rotary wing aircraft having two rotors arranged in tandem wherein changes in attitude of the aircraft about its pitch axis are brought about by changes in differential collective pitch, said control apparatus comprising manual control means, connecting linkage operatively connected to said pitch changing mechanism to vary the tip path of said rotors, an automatic control means, said manual control means and said automatic control means being connected to said connecting linkage to control the tip path planes of the rotors about axes parallel to the pitching axis of the aircraft, said connecting linkage including adjustable proportioning means, said adjustable proportioning means acting to change the proportion of the total amount of the blade pitch control that is applied by either of said manual means or said automatic means.

5. The combination as set forth in claim 4 and including speed responsive servo means, said servo means being operatively connected to the adjustable proportioning means to increase the authority of the automatic control means and decrease the authority of the manual control means with increase of airspeed and decrease the authority of the automatic control means and increase the authority of the manual control means with decrease of airspeed.

6. The combination as set forth in claim 4 and including manual adjusting means operatively connected to the adjustable proportioning means, said adjusting means permitting the pilot to manually adjust the proportion of control applied by the automatic control means and the manual control means.

References Cited in the file of this patent

UNITED STATES PATENTS

| | | |
|---|---|---|
| 2,256,635 | Young | Sept. 23, 1941 |
| 2,397,154 | Platt | Mar. 26, 1946 |
| 2,444,070 | Stanley | June 29, 1948 |
| 2,529,479 | Bates | Nov. 14, 1950 |
| 2,652,898 | Renoux | Sept. 22, 1953 |

FOREIGN PATENTS

| | | |
|---|---|---|
| 878,912 | France | Nov. 2, 1942 |
| 888,158 | France | Aug. 30, 1943 |